US011189306B1

(12) United States Patent
Biskeborn et al.

(10) Patent No.: US 11,189,306 B1
(45) Date of Patent: Nov. 30, 2021

(54) REDUCED-STRESS TAPE HEAD MODULE

(71) Applicant: International Business Machines Corporation, Armonk, NY (US)

(72) Inventors: Robert Biskeborn, Hollister, CA (US); Calvin Shyhjong Lo, Saratoga, CA (US); Hoodin Hamidi, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/115,627

(22) Filed: Dec. 8, 2020

(51) Int. Cl.
 *G11B 5/187* (2006.01)
(52) U.S. Cl.
 CPC ................................. *G11B 5/187* (2013.01)
(58) Field of Classification Search
 None
 See application file for complete search history.

(56) References Cited

U.S. PATENT DOCUMENTS

| | | | |
|---|---|---|---|
| 4,819,113 A | 4/1989 | Kubota et al. | |
| 5,329,795 A | 7/1994 | Sartorio et al. | |
| 5,485,335 A | 1/1996 | West | |
| 5,636,092 A | 6/1997 | Nasu et al. | |
| 5,754,370 A | 5/1998 | Tsuchiya et al. | |
| 6,690,542 B1* | 2/2004 | Wang | G11B 5/115 360/129 |
| 8,089,722 B2* | 1/2012 | Iben | G11B 5/11 360/121 |
| 8,643,971 B1* | 2/2014 | Biskeborn | G11B 5/00891 360/55 |
| 8,824,083 B1 | 9/2014 | Kientz et al. | |
| 9,661,411 B1 | 5/2017 | Han et al. | |
| 9,799,355 B1* | 10/2017 | Biskeborn | G11B 5/3173 |
| 10,395,675 B1 | 8/2019 | Biskeborn | |
| 10,607,635 B2* | 3/2020 | Biskeborn | G11B 5/255 |
| 10,607,637 B2 | 3/2020 | Biskeborn | |
| 10,748,573 B2 | 8/2020 | Biskeborn et al. | |

(Continued)

FOREIGN PATENT DOCUMENTS

WO 2008089665 A1 7/2008

OTHER PUBLICATIONS

Biskeborn, R. G., U.S. Appl. No. 15/936,138, filed Mar. 26, 2018.

(Continued)

*Primary Examiner* — William J Klimowicz
(74) *Attorney, Agent, or Firm* — Zilka-Kotab, P.C.

(57) ABSTRACT

An apparatus, according to one embodiment, includes at least one reading die coupled to a pedestal of an associated read beam, each reading die having an array of read transducers extending parallel to a longitudinal axis of the reading die. At least one writing die is coupled to a pedestal of an associated write beam, each writing die having an array of write transducers extending parallel to a longitudinal axis of the writing die. The read and write beams are coupled together thereby forming a head. At least one region of at least one of the dice is cantilevered over the associated beam. Widths of the reading and writing dice measured in a direction of tape travel thereover are substantially the same. Widths of the pedestals of the read and write beams measured in the direction of tape travel thereover are substantially the same.

20 Claims, 14 Drawing Sheets

(56) References Cited

U.S. PATENT DOCUMENTS

| | | | |
|---|---|---|---|
| 10,770,099 | B2 | 9/2020 | Biskeborn |
| 10,783,905 | B2 | 9/2020 | Biskeborn |
| 2001/0017749 | A1 | 8/2001 | Stefansky |
| 2003/0116874 | A1 | 6/2003 | Haynes |
| 2003/0202291 | A1 | 10/2003 | Pan et al. |
| 2004/0027725 | A1 | 2/2004 | Pan et al. |
| 2006/0023358 | A1 | 2/2006 | Huang |
| 2008/0049358 | A1* | 2/2008 | Biskeborn ............ G11B 5/1872 360/128 |
| 2008/0252357 | A1* | 10/2008 | Biskeborn ............ G11B 5/4984 327/419 |
| 2010/0073816 | A1 | 3/2010 | Komori et al. |
| 2015/0194171 | A1 | 7/2015 | Chua |
| 2016/0211439 | A1 | 7/2016 | Najafi et al. |
| 2019/0304492 | A1* | 10/2019 | Biskeborn .......... G11B 5/00821 |
| 2019/0304493 | A1 | 10/2019 | Biskeborn |
| 2020/0066300 | A1 | 2/2020 | Biskeborn |

OTHER PUBLICATIONS

Restriction Requirement from U.S. Appl. No. 15/936,138, dated Jan. 14, 2019.

Ex Parte Quayle from U.S. Appl. No. 15/936,138, dated Apr. 9, 2019.

Notice of Allowance from U.S. Appl. No. 15/936,138, dated Apr. 30, 2019.

Biskeborn, R. G., U.S. Appl. No. 16/446,490, filed Jun. 19, 2019.

Notice of Allowance from U.S. Appl. No. 16/446,490, dated Sep. 26, 2019.

Supplemental Notice of Allowance from U.S. Appl. No. 16/446,490, dated Oct. 30, 2019.

Notice of Allowance from U.S. Appl. No. 16/446,490, dated Nov. 22, 2019.

Supplemental Notice of Allowance from U.S. Appl. No. 16/446,490, dated Dec. 11, 2019.

Supplemental Notice of Allowance from U.S. Appl. No. 16/446,490, dated Jan. 15, 2020.

Biskeborn, R. G., U.S. Appl. No. 16/447,765, filed Jun. 20, 2019.

Non-Final Office Action from U.S. Appl. No. 16/447,765, dated Oct. 17, 2019.

Final Office Action from U.S. Appl. No. 16/447,765, dated Mar. 26, 2020.

Notice of Allowance from U.S. Appl. No. 16/447,765, dated May 19, 2020.

Supplemental Notice of Allowance from U.S. Appl. No. 16/447,765, dated Jul. 9, 2020.

Supplemental Notice of Allowance from U.S. Appl. No. 16/447,765, dated Aug. 20, 2020.

Biskeborn, R. G., U.S. Appl. No. 16/670,958, filed Oct. 31, 2019.

Non-Final Office Action from U.S. Appl. No. 16/670,958, dated Dec. 11, 2019.

Notice of Allowance from U.S. Appl. No. 16/670,958, dated May 4, 2020.

Supplemental Notice of Allowance from U.S. Appl. No. 16/670,958, dated May 28, 2020.

Supplemental Notice of Allowance from U.S. Appl. No. 16/670,958, dated Aug. 5, 2020.

Nortronics Co., "Magnetic Tape Head Specifications," Dec. 2013, pp. 1-6 retrieved from http://lcweb2.loc.gov/master/mbrs/recording_preservation/manuals/Nortraonics%20Magnetic%20Tape%20Heads%20Specifications.pdf.

* cited by examiner

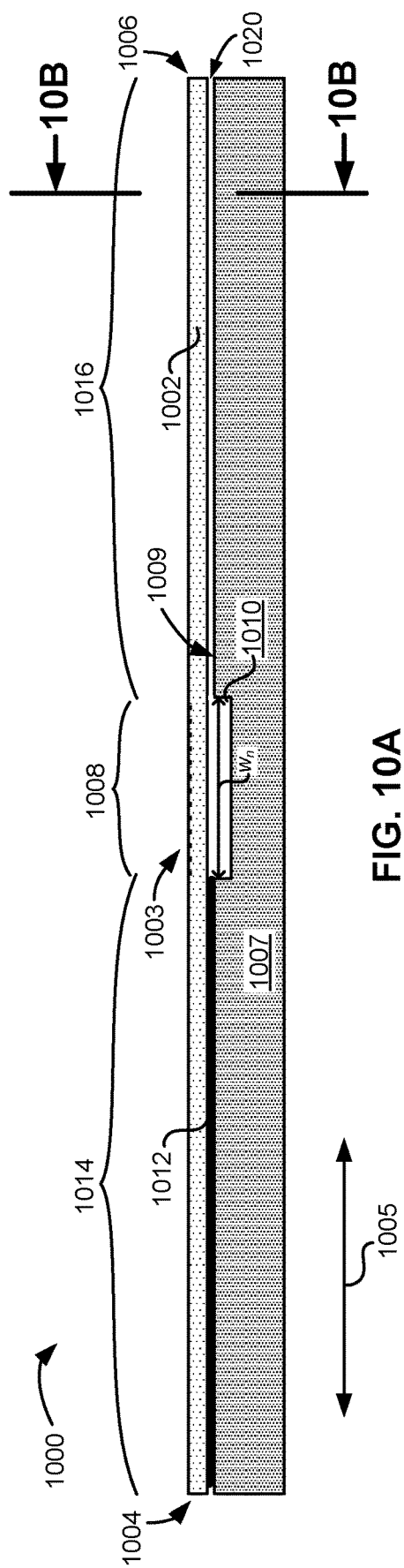
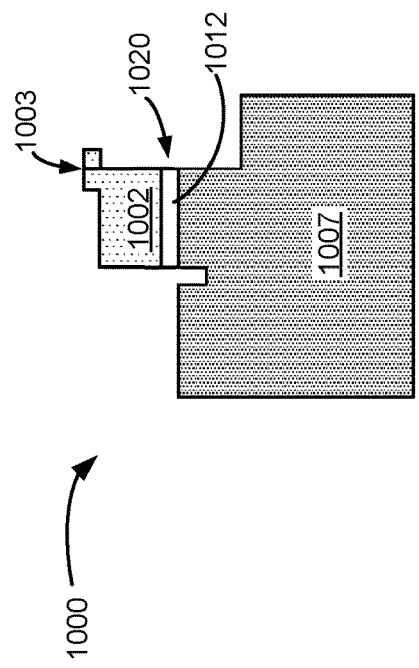
FIG. 10A
FIG. 10B

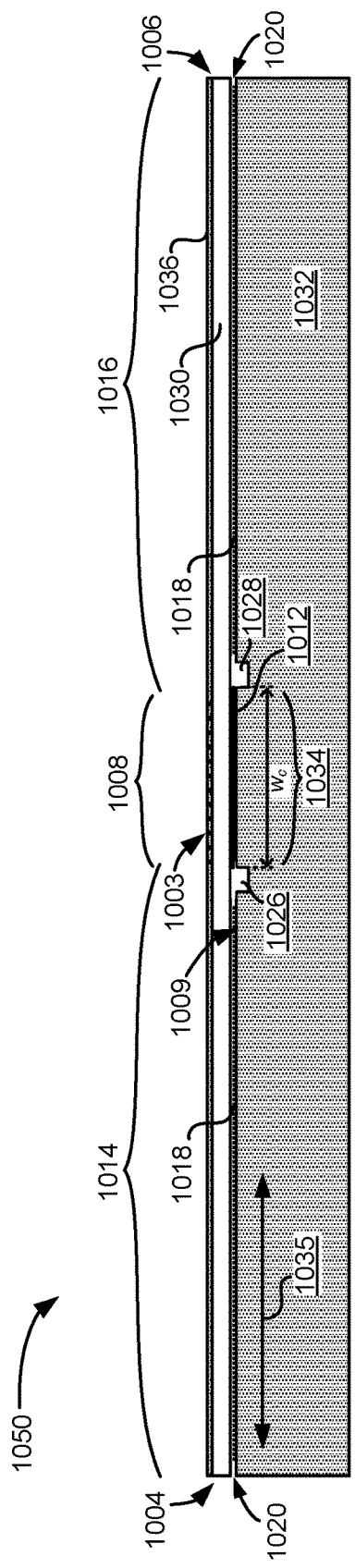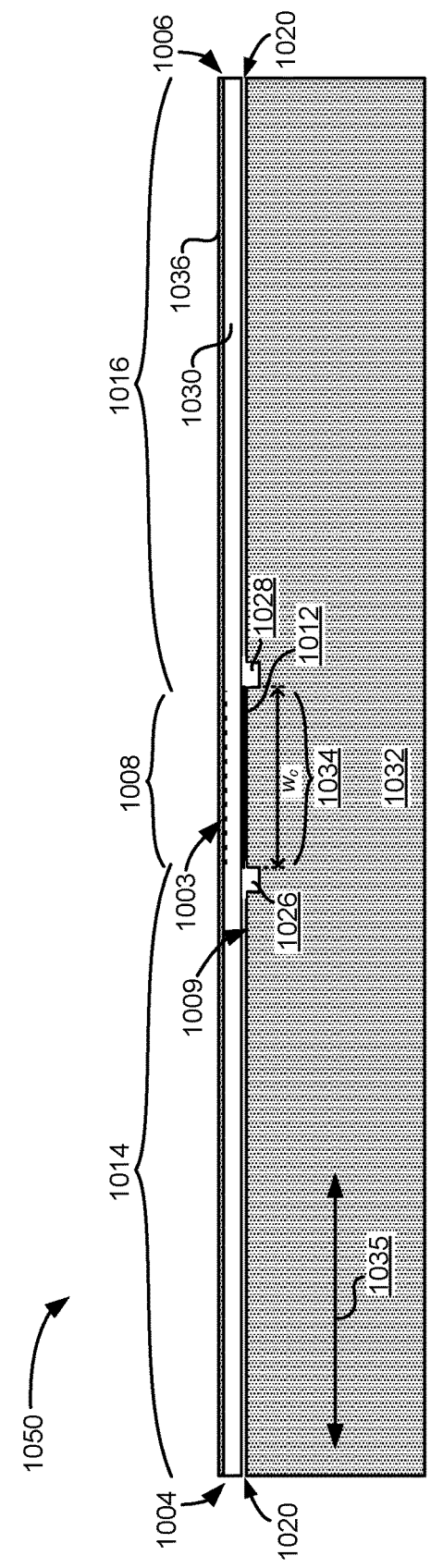
FIG. 10C
FIG. 10D

REDUCED-STRESS TAPE HEAD MODULE

BACKGROUND

The present invention relates to magnetic tape head modules, and more particularly, this invention relates to magnetic tape head modules constructed to have minimal stress.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux, in near contact with the tape to effect writing sharp transitions, and to have the read elements in near contact with the tape to provide effective coupling of the magnetic field from the tape to the read elements.

SUMMARY

An apparatus, according to one embodiment, includes at least one reading die coupled to a pedestal of an associated read beam, each reading die having an array of read transducers extending parallel to a longitudinal axis of the reading die. At least one writing die is coupled to a pedestal of an associated write beam, each writing die having an array of write transducers extending parallel to a longitudinal axis of the writing die. The read and write beams are coupled together thereby forming a head. At least one region of at least one of the dice is cantilevered over the associated beam. Widths of the reading and writing dice measured in a direction of tape travel thereover are substantially the same. Widths of the pedestals of the read and write beams measured in the direction of tape travel thereover are substantially the same.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 10A is a side view of a module, in accordance with one embodiment.

FIG. 10B is a cross-sectional view of FIG. 10A taken along line 10B-10B.

FIG. 10C is a side view of a schematic diagram of a portion of a module, in accordance with one embodiment.

FIG. 10D is a side view of the module of FIG. 10C after removal of sacrificial adhesive, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of an apparatus having a low-stress magnetic tape head module, as well as operation and/or component parts thereof.

In one general embodiment, an apparatus includes at least one reading die coupled to a pedestal of an associated read beam, each reading die having an array of read transducers extending parallel to a longitudinal axis of the reading die. At least one writing die is coupled to a pedestal of an associated write beam, each writing die having an array of write transducers extending parallel to a longitudinal axis of the writing die. The read and write beams are coupled together thereby forming a head. At least one region of at least one of the dice is cantilevered over the associated beam. Widths of the reading and writing dice measured in a direction of tape travel thereover are substantially the same. Widths of the pedestals of the read and write beams measured in the direction of tape travel thereover are substantially the same.

Figure 1A:
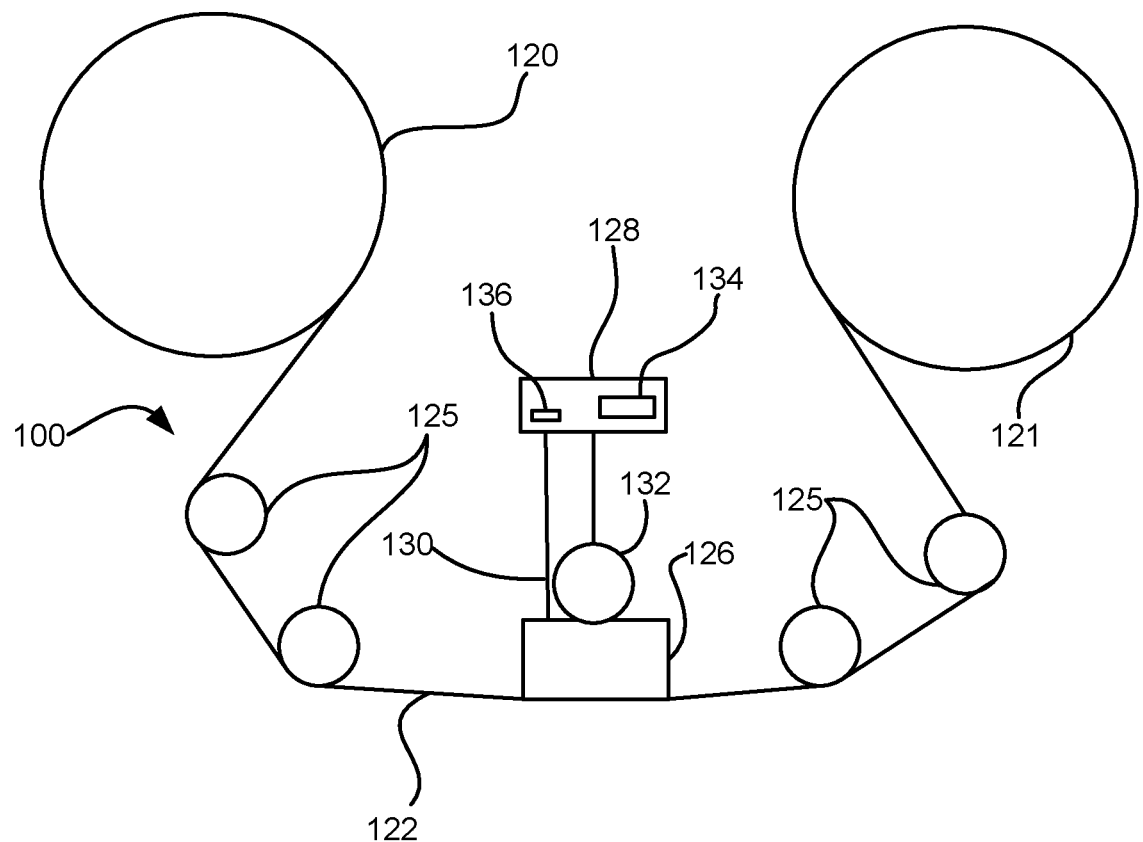
FIG. 1A is a schematic diagram of a simplified tape drive system, in accordance with one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of read transducers (also referred to as readers), write transducers (also known in the art as writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
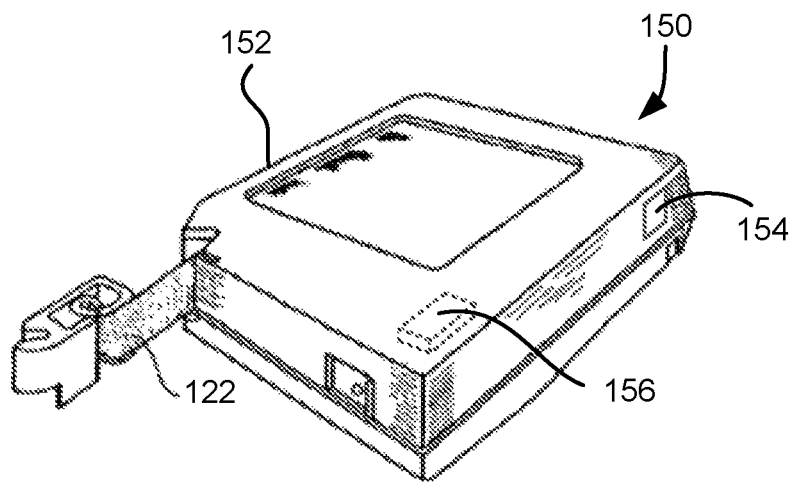
FIG. 1B is a schematic diagram of a tape cartridge, in accordance with one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
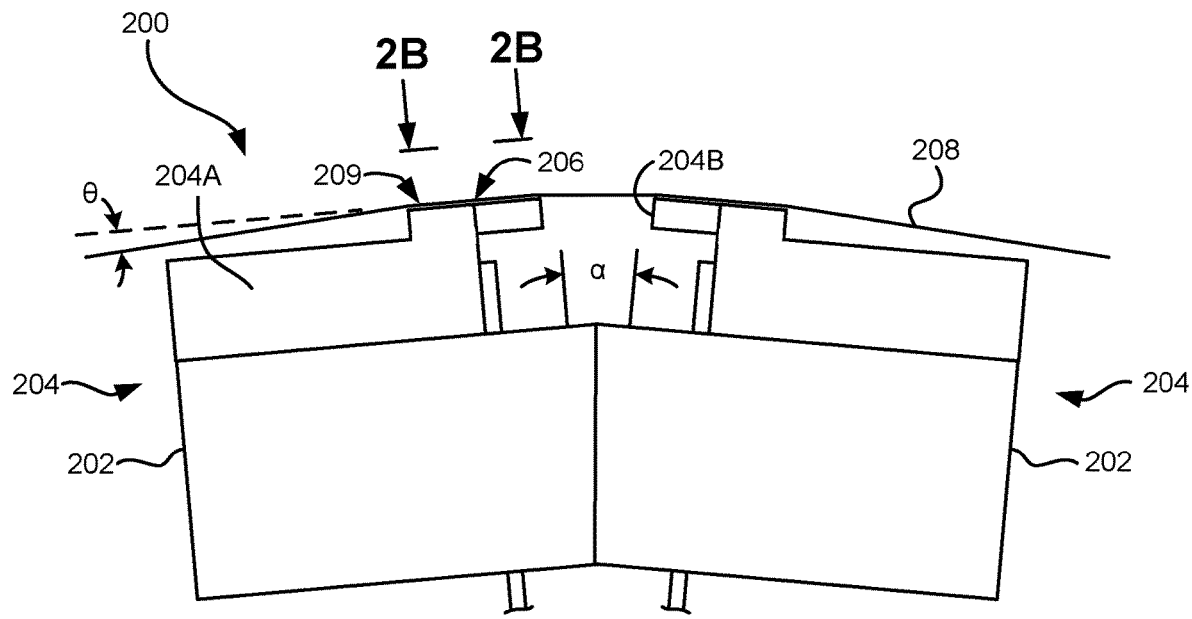
FIG. 2A illustrates a side view of a flat-lapped, bi-directional, two-module magnetic tape head, in accordance with one embodiment.

By way of example, FIG. 2A illustrates a side view of a flat-lapped, bi-directional, two-module magnetic tape head 200 which may be implemented in the context of the present invention. As shown, each module 204 includes a beam 202, the beams 202 being fixed at a small angle α with respect to each other. The beams may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2B:
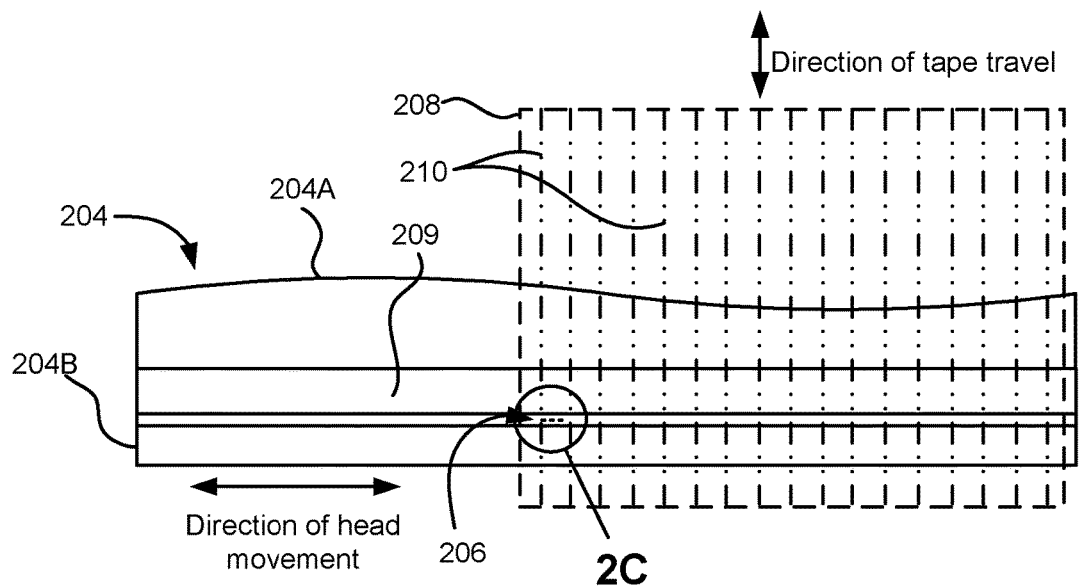
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2C:
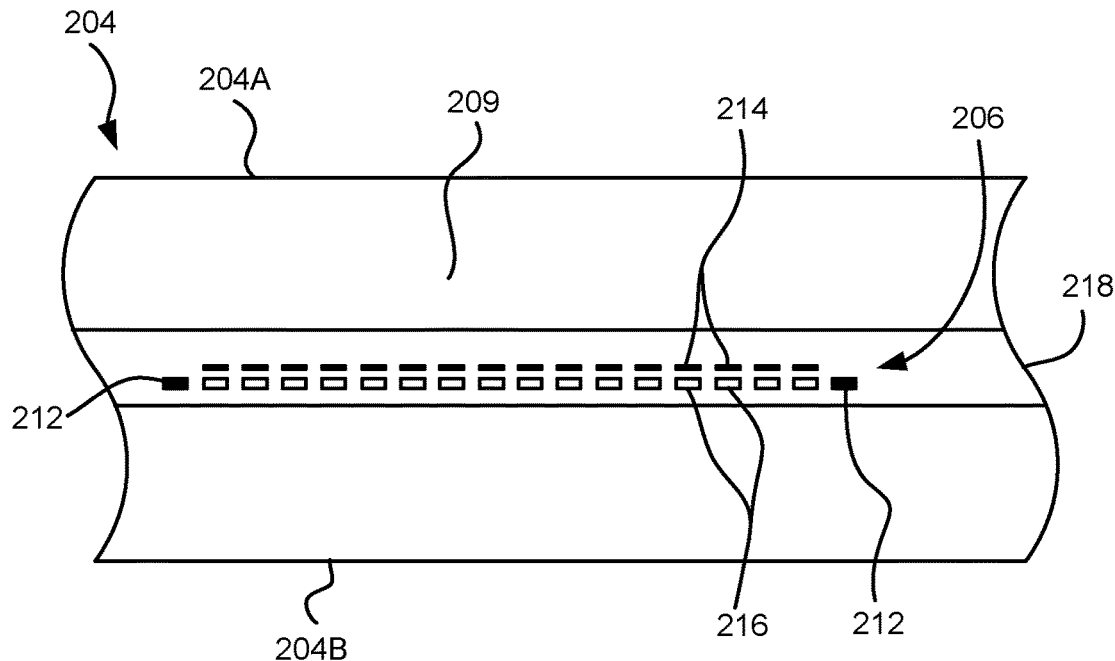
FIG. 2C is a detailed view taken from Circle 2C of FIG. 2B.

FIG. 2C depicts a plurality of read transducers and/or write transducers 206 formed in a gap 218 on the module 204 in Circle 2C of FIG. 2B. As shown in FIG. 2C, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2C, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2A and 2B-2C together, each module 204 may include a complementary set of read transducers and/or write transducers 206 for such things as bi-directional reading and writing, read-while-write capability, backward compatibility, etc.

Figure 2D:
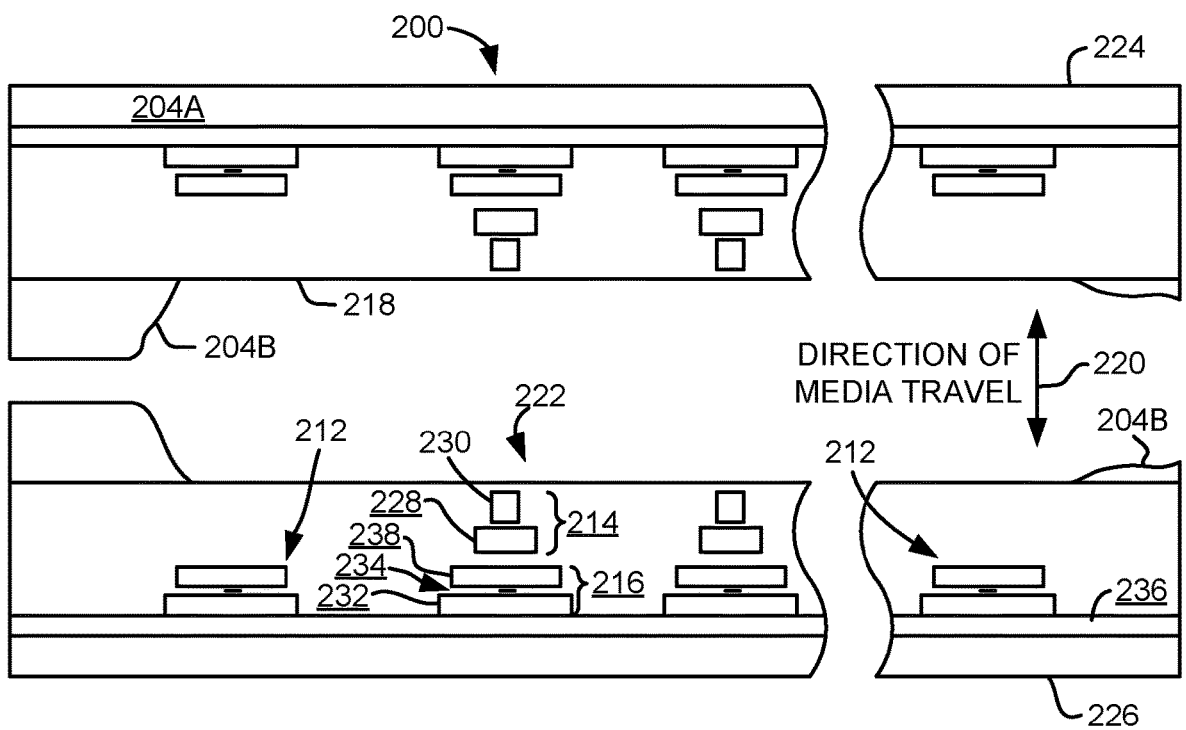
FIG. 2D is a detailed view of a partial tape bearing surface of a pair of modules, in accordance with one embodiment.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
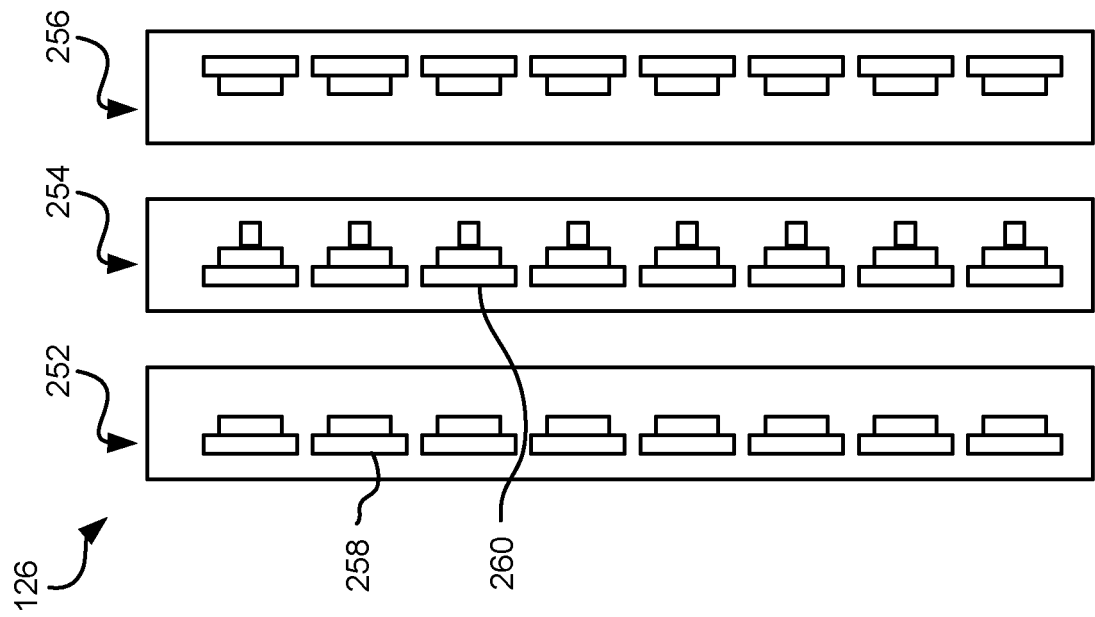
FIG. 4 is a partial tape bearing surface view of a magnetic head having a read-write-read configuration, in accordance with one embodiment.
Figure 3:
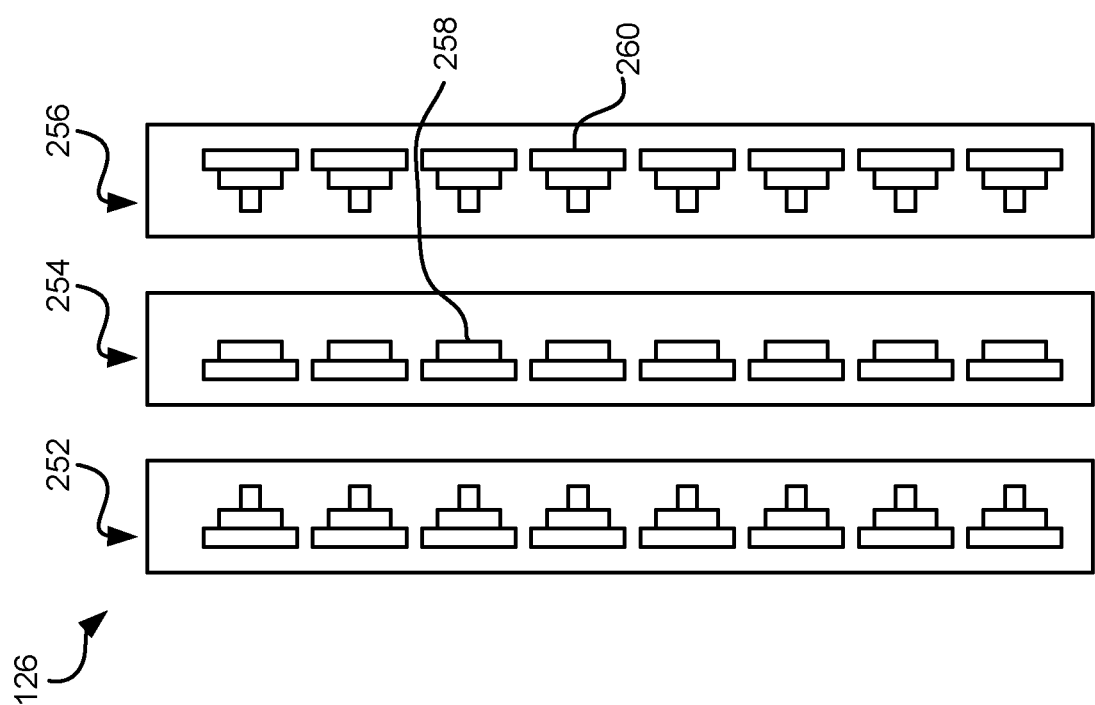
FIG. 3 is a partial tape bearing surface view of a magnetic head having a write-read-write configuration, in accordance with one embodiment.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
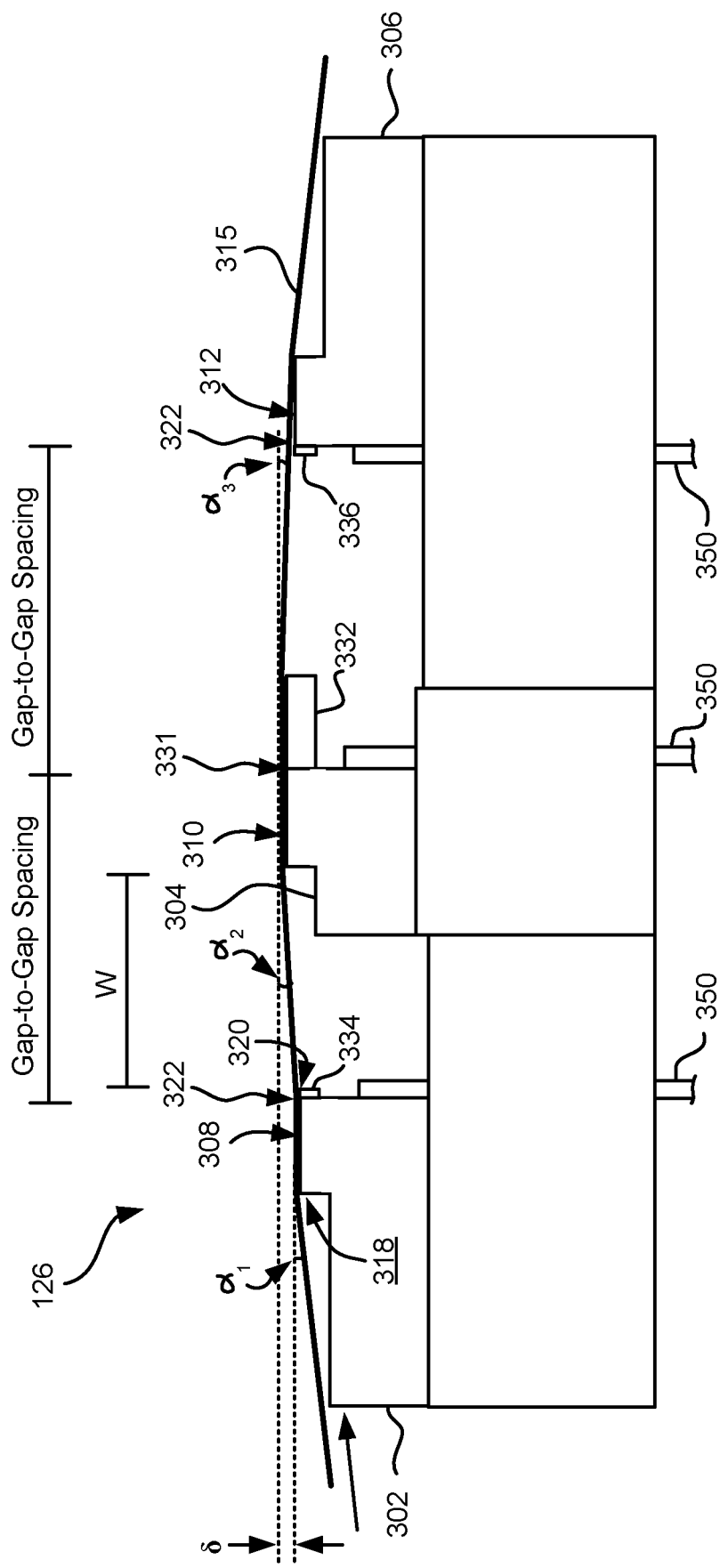
FIG. 5 is a side view of a magnetic tape head with three modules according to one embodiment where the modules all generally lie along about parallel planes, in accordance with one embodiment.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
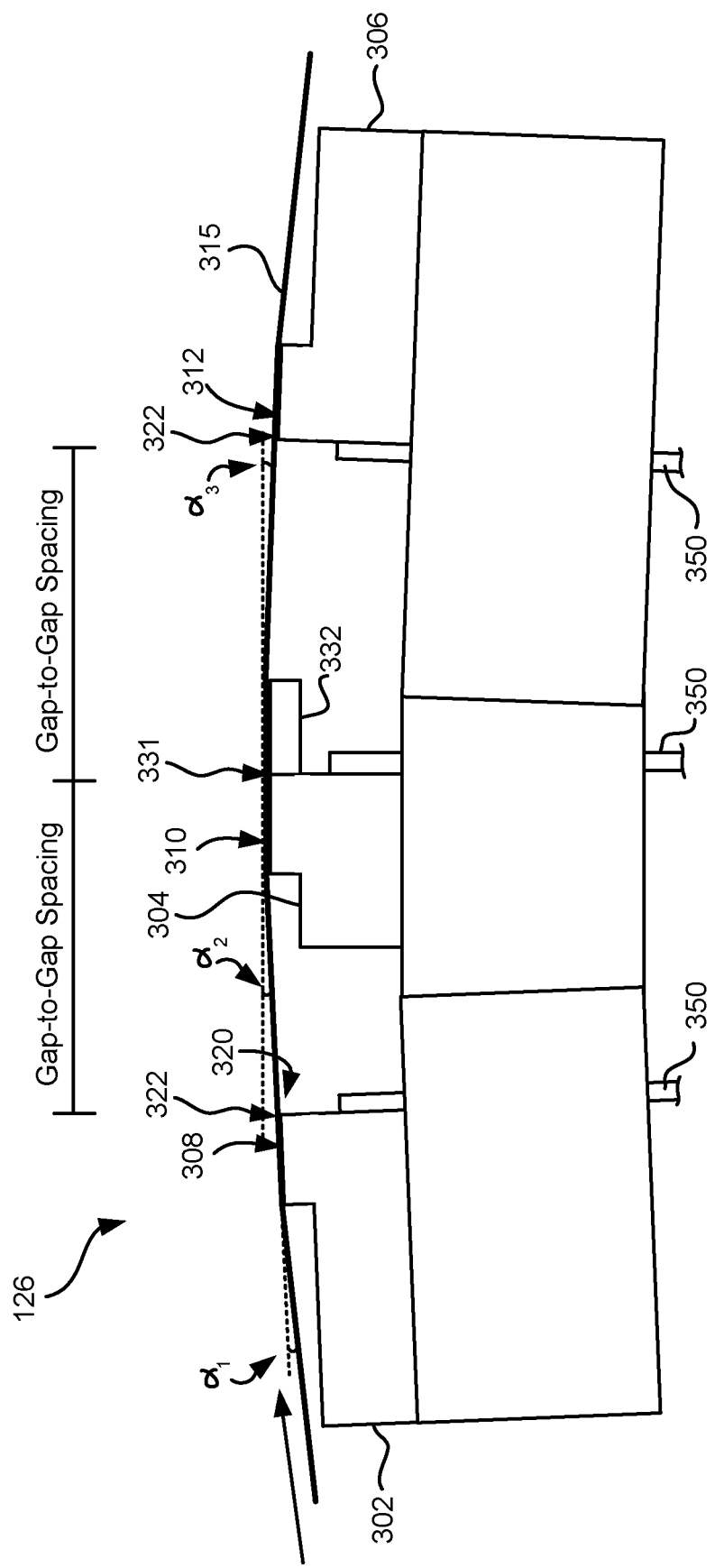
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
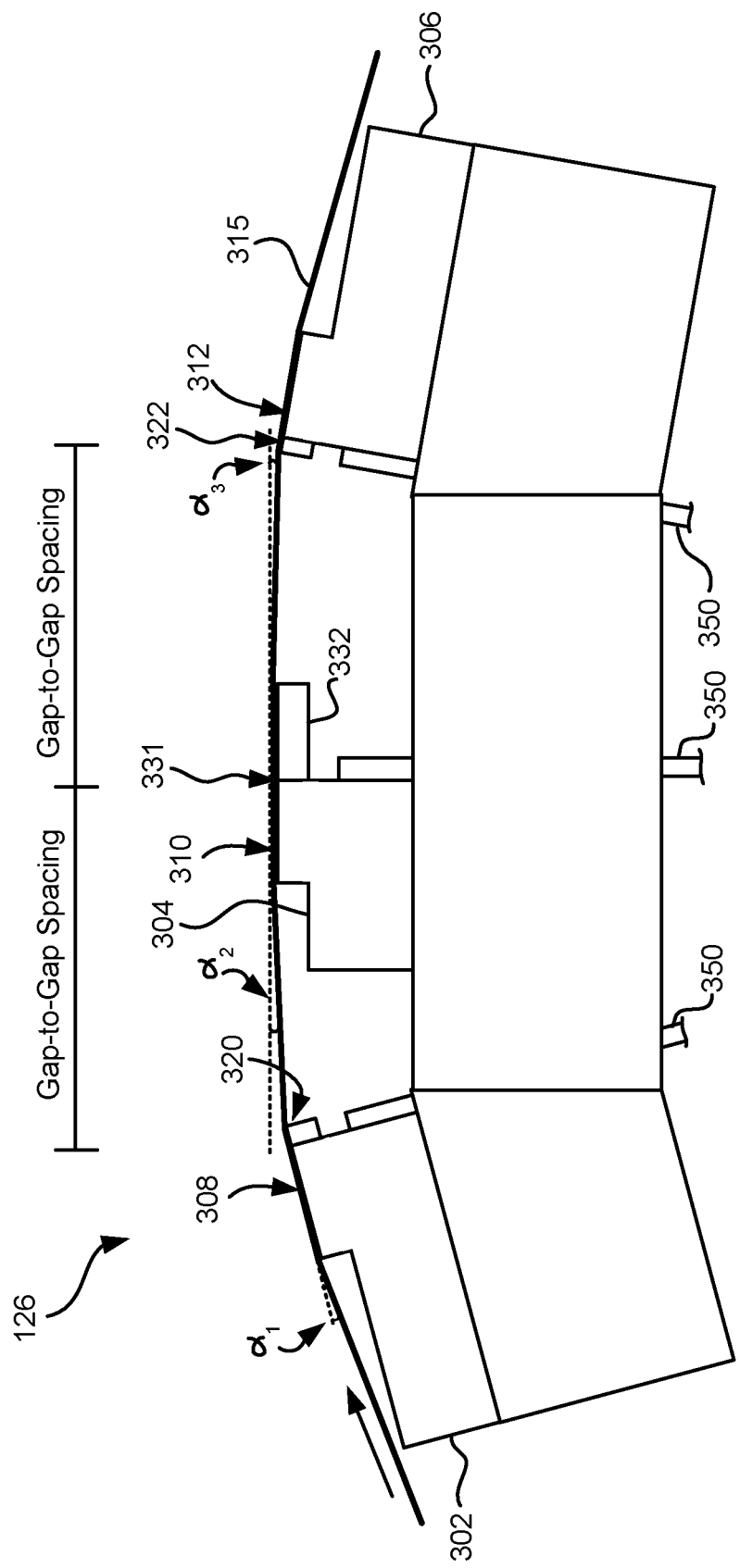
FIG. 7 is a side view of a magnetic tape head with three modules in an overwrap configuration, in accordance with one embodiment.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
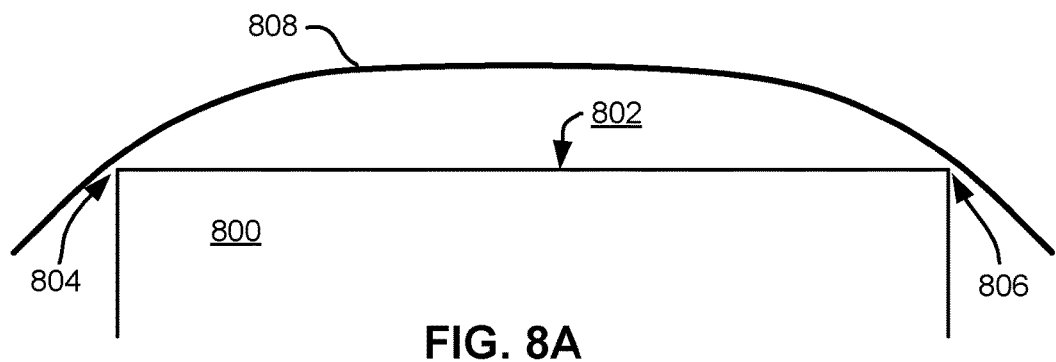
FIGS. 8A-8C are schematics depicting the principles of tape tenting.
Figure 8B:
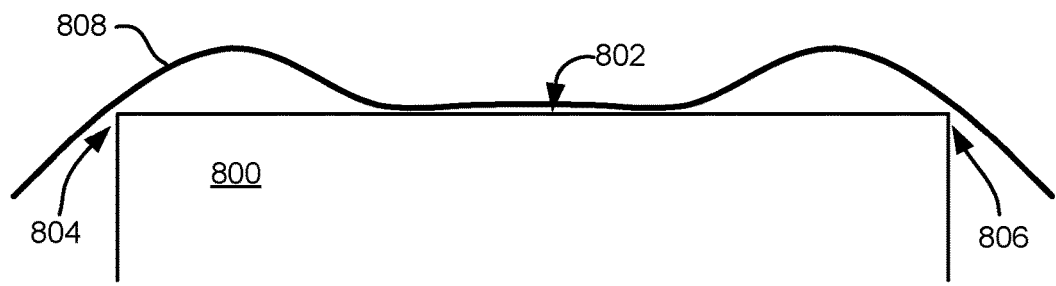
Figure 8C:
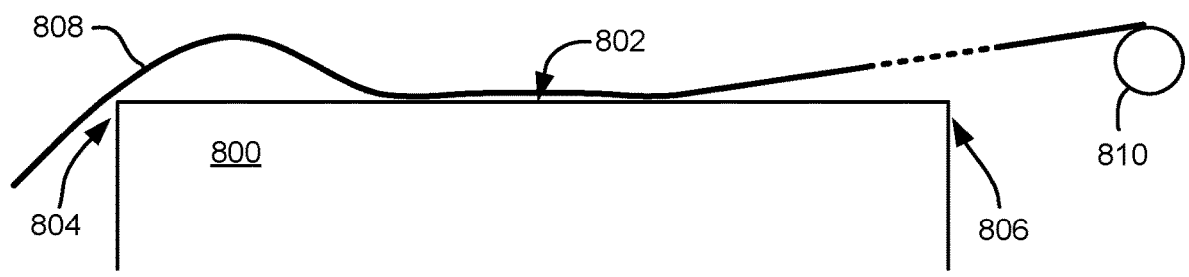

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge, and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
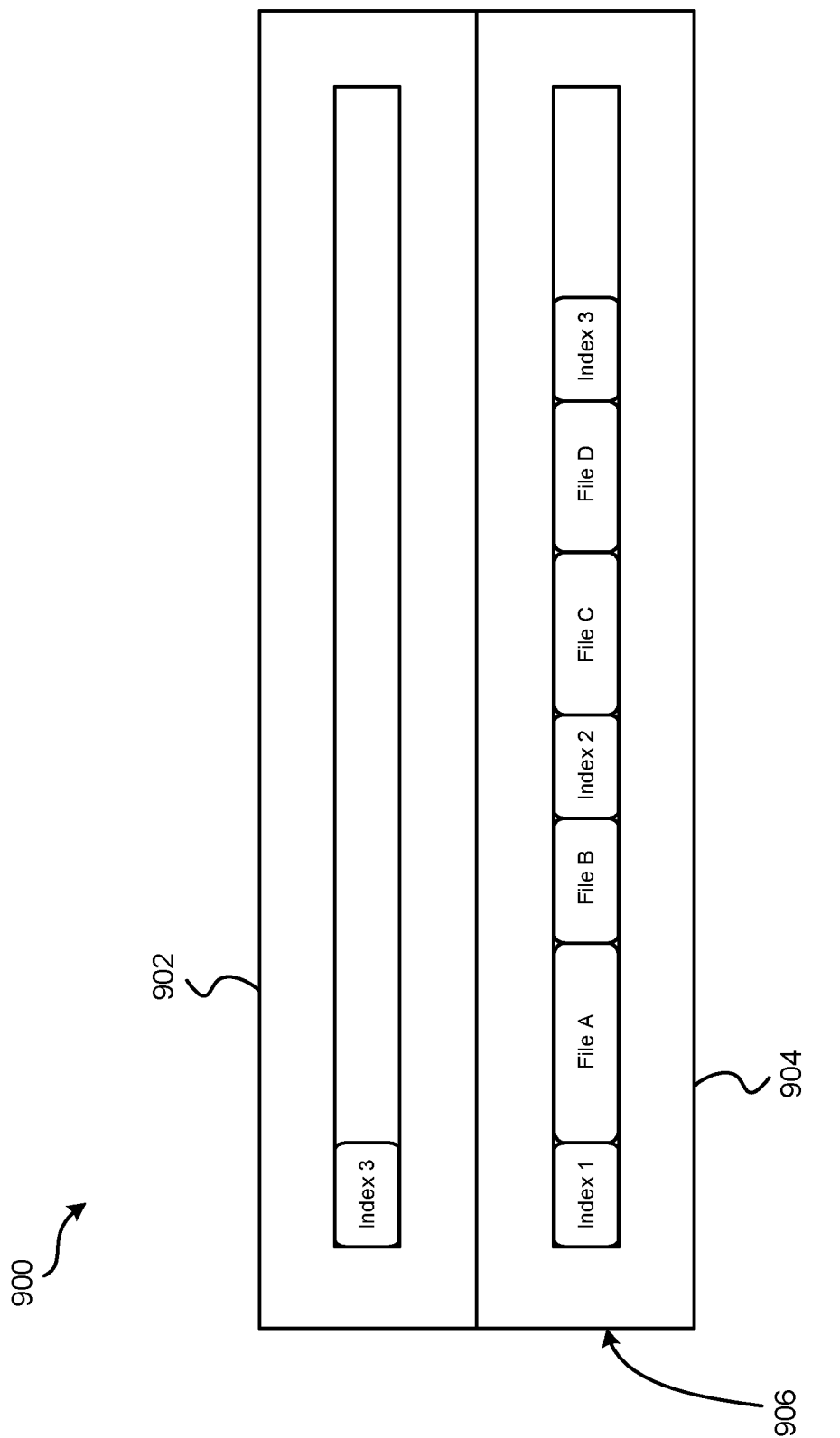
FIG. 9 is a representational diagram of files and indexes stored on a magnetic tape, in accordance with one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Tape cartridge capacity in conventional tape head modules may be limited to 15 to 20 terabytes because of assembly of the modules on current U-beam technology. The modules in the form of wafer dice are typically secured to beam supports, e.g. U-beams, that provide a stable and robust base for the thin and fragile wafer dice.

Conventional U-beams tend to be sintered aluminum oxide, preferably containing other elements to make the material electrostatically dissipative. However, during the assembly process, the U-beams and the fragile dice attached to the U-beams tend to become distorted for some reason. Without wishing to be bound by any particular theory, it is currently believed that some of the distortion occurs due to heat cycling steps of the head build, for example, during the curing of the wire bond strain relief. Specifically, curing wire bond strain relief adhesive involves heating the cabled module assemblies to 70° C. for up to two hours. During this process, the U-beams expand and anneal, and may not return to the pre-anneal dimensions. Since the attached die tends to generally follow the motion of the U-beam, the critical span between the servo readers and the magnetic recording transducers situated therebetween on the die may change. The effect of the U-beam changes on the attached die may vary from module to module, thereby resulting in recording modules with a transducer pitch that is different for different modules.

The inconsistency in element pitch from one multichannel tape head module to another limits how tightly tracks can be spaced on tape (track pitch), and thus how much data can be stored on a tape. For example, the variability of transducer pitch between different modules may result in an inability to read a tape that was shingle-written by one drive in the same or other drives. The effect today is approximately +/−100 ppm. This suggests that future track density may be limited to roughly three times today's density, implying that multichannel recording systems may reach capacity growth limits in 2-4 years, in the absence of present invention. Other attempts to address this problem, chiefly tension control, have not be fully successful. What is needed are heads having less span variation.

The inventors conducted tests on conventional three module heads in an effort to better understand the aforementioned problems, as the reasons for the inconsistency in transducer pitch are not fully understood. The three module heads used in the experiments had a reading module flanked by two writing modules (to enable bi-directional recording). The conventional writing modules are of a different physical construction than the conventional reading modules, for several reasons having to do with ease of manufacturing. The inventors were surprised to discover that both spans and span variability were consistently worse for writer vs. reader modules. The inventors attempted to apply the same gluing techniques as used on the reader module on the writer modules, and were surprised to discover that application of the same gluing techniques on the writer modules made no difference.

After sorting through construction differences, the inventors realized that the results are in part consistent with the more than two times larger in-plane width of the writer dice compared to the reader dice, as measured in the intended direction of tape-travel thereacross. This in turn led to the modules having the new features presented herein. One goal of the new design is to make the mechanical characteristics of the writer module as close to those of the reader module as possible, including the in-plane width. Moreover, the cantilever construction further reduces residual stresses, as explained in detail below.

According to various embodiments described herein, the modules have physical features that minimize extraneous stresses exerted upon a die, thereby allowing the die to substantially retain its as-made transducer pitch. Consequently, the dice tend to not be subject to significant variability of transducer pitch between different modules, but rather consistency of transducer pitch from module to module is now achievable.

FIG. 10A is a schematic drawing depicting a low stress tape head module 1000, in accordance with one embodiment. As an option, the present module 1000 may be implemented in conjunction with features from any other embodiment listed herein, such as those described with reference to the other FIGS. Of course, however, such a module 1000 and others presented herein may be used in various applications and/or in permutations which may or may not be specifically described in the illustrative embodiments listed herein. Further, the module 1000 presented herein may be used in any desired environment.

Referring to FIG. 10A, the module 1000 includes a die 1002 bonded to a beam 1007.

The die 1002 includes an array of transducers 1003 positioned in a transducer region 1008 of the die 1002. The die 1002 includes a first region 1014 extending from the transducer region 1008 along a longitudinal axis of the die 1002 (parallel to direction 1005) to a first end 1004 of the die 1002 and a second region 1016 extending from the transducer region 1008 to a second end 1006 of the die 1002. According to one embodiment, the regions, for example, the first region 1014 and the second region 1016, may not overlap. The die 1002 may be of conventional construction in various approaches.

In addition, the module 1000 includes a beam 1007. In some approaches the beam may be a U-beam, e.g., of conventional construction.

In various approaches described herein, the U-beams may optionally be annealed by heat and temperature cycling prior to bonding of the die thereto, thereby allowing the U-beam to undergo a mechanical relaxation before the die attachment. Then, any annealing process applied to the module 1000 after die attachment may result in little or essentially no U-beam dimensional changes.

As shown in FIG. 10A, the first region 1014 of the die 1002 may be fixedly attached to the beam 1007. In addition, the transducer region 1008 and the second region 1016 are not fixedly attached to the beam 1007. Further, a space 1020 may be present between the beam 1007 and the regions of the die 1002 that are not fixedly attached to the beam 1007. Alternatively, in other embodiments, the second region 1016 of the die 1002 may be fixedly attached to the beam 1007 and the transducer region 1008 and the first region 1014 are not fixedly attached to the beam 1007.

By fixedly coupling only the first region 1014 of the die 1002 to the beam 1007, any stresses acting within or upon the beam 1007 are not transferred to the transducer region 1008 of the die 1002, and thus the array of transducers 1003 within the die 1002 are not notably affected by such stresses.

Any known technique, material, etc. may be used to couple the die 1002 to the beam 1007. In some embodiments, an adhesive 1012 fixedly attaches the die 1002 to the beam 1007. Illustrative adhesives include cyanoacrylate (e.g. Loctite®380), epoxy resin, two-part epoxy, etc.

The adhesive 1012 may be applied only in the target area, e.g., under the first region 1014 of the die 1002. For example, the adhesive 1012 may be applied in the target area, the die aligned to the beam, and the adhesive allowed to cure.

In preferred approaches, the adhesive 1012 is applied in the target area, and a second adhesive (not shown) is applied along the opposite portion of the die 1002 to enhance stability of the die during adhesive curing, and then removed, e.g., via solvent. The adhesive 1012 would not be significantly affected by the solvent. In one example, a solvent-resistant adhesive 1012 may fixedly attach the die to the beam under the first region 1014, while a sacrificial adhesive that dissolves in solvent is applied under the second region 1016, and later removed by application of the solvent thereto. An illustrative solvent is acetone, though any suitable known adhesives/solvent combination may be implemented.

In some approaches, a sacrificial adhesive may be applied to facilitate taperless grind, beveling, cabling, wire bonding, etc. In some approaches, the sacrificial adhesive may hold the die 1002 to the beam 1007 while the solvent-resistant adhesive 1012 sets. Further, the sacrificial adhesive may be wicked in after the module is bonded to actuator pocket (not shown), and then the sacrificial adhesive may be dissolved in acetone after cable cure.

In a further approach, the second region 1016, and optionally the transducer region 1008, may be flexibly attached to the beam, e.g., by a flexible adhesive. Such flexible adhesive may remain in the module, i.e., is not removed, for such purposes as to allow it to dampen any resonance that may occur during use in what would otherwise be the cantilevered region of the die. Any known type of flexible adhesive may be used. For example, a flexibilized epoxy may be used.

Note that as used herein, flexibly attached is not the same as fixedly attached. The flexible attachment should give enough to relieve any significant amount of stress that would otherwise by exerted on the die due to expansion or contraction of the beam.

In some approaches, the module 1000 may include a notch 1010 in the beam 1007, where the notch 1010 may be positioned on a die-facing side 1009 of the beam 1007 and between a first end 1004 and a second end 1006 of the beam 1007. In some approaches, the notch may be a channel, recessed portion, etc. The notch 1010 may act as an adhesive overflow reservoir for preventing excess adhesive from flowing under and beyond the transducer region 1008 of the die 1002.

In preferred approaches, the notch 1010 may be positioned under the array of transducers 1003. In some approaches, the notch 1010 may be positioned under about the transducer region 1008 of the die 1002. In further approaches, the notch may extend along the beam 1007 beyond the extent of the transducer region 1008, toward the end of beam coupled to the die.

In some approaches, a width $w_n$ of the notch 1010 parallel to the longitudinal axis of the die may be at least a width of the array of transducers 1003 along the longitudinal axis of the die 1002 as measured between the outermost transducers. In other approaches, the width $w_n$ of the notch 1010 is less than the width of the array of transducers 1003. As shown in FIG. 10A, the end of the notch 1010 closest to the adhesive 1012 is preferably under the first region 1014 to prevent adhesive from coupling the transducer region 1008 directly to the beam 1007.

The side view of the module 1000 in FIG. 10B shows the space 1020 between the die 1002 and the beam 1007, with the adhesive 1012 shown behind the space 1020.

Note that, in various embodiment, provision is made to preserve the stress free state of the un-fixed portion of the die during subsequent processing steps. For example, adhesive may be applied to the wire bonds, which could wick into the open area under the un-fixed portion of the die. Accordingly, conventional processing techniques may be modified to prevent such wicking. Similarly, provision should be made to ensure similar wicking does not occur when using an adhesive to couple modules together. Such provisioning could include cutting slots into the beam, applying a sacrificial material to the un-fixed portion of the die and later removing the same, etc.

FIG. 10C depicts a schematic drawing of a low stress tape head module 1050, in accordance with one embodiment. As an option, the present module 1050 may be implemented in conjunction with features from any other embodiment listed herein, such as those described with reference to the other FIGS. Of course, however, such a module 1050 and others presented herein may be used in various applications and/or in permutations which may or may not be specifically described in the illustrative embodiments listed herein. Further, the module 1050 presented herein may be used in any desired environment.

Referring to FIG. 10C, the module 1050 includes a die 1030 bonded to a beam 1032.

The die 1030 includes an array of transducers 1003 in a transducer region 1008 of the die 1030, a first region 1014 extending from the transducer region 1008 along a longitudinal axis of the beam 1032 to a first end 1004 the die 1030 and a second region 1016 extending from the transducer region 1008 to a second end 1006 of the die 1030. According to one embodiment, the regions, for example, the first region 1014 and the second region 1016, may not overlap. The die 1030 may be of conventional construction in various approaches.

In addition, the module 1050 includes a beam 1032. In some approaches the beam may be a U-beam, e.g., of conventional construction.

In various approaches described herein, the U-beams may optionally be annealed by heat and temperature cycling prior to bonding of the die thereto, thereby allowing the U-beam to undergo a mechanical relaxation before the die attachment. Then, any annealing process applied to the module 1050 after die attachment may result in little or essentially no U-beam dimensional changes.

As shown in FIGS. 10C-10D, the transducer region 1008 of the die 1030 may be fixedly attached to the beam 1032. In addition, the first region 1014 and the second region 1016 may not be fixedly attached to the beam 1032, as shown in FIG. 10D. Further, spaces 1020 may be present between the beam 1032 and the regions 1014, 1016 of the die 1030 that are not fixedly attached to the beam 1032.

By coupling only the transducer region 1008 of the die 1030 to the beam 1032, any stresses acting within or upon the beam 1032 are only minimally transferred to the transducer region 1008 of the die 1030 at the localized area of bonding, and thus the array of transducers 1003 within the die 1030 are not notably affected by such stresses.

Any known technique, material, etc. may be used to couple the die 1030 to the beam 1032. In some embodiments, an adhesive 1012 fixedly attaches the die 1030 to the beam 1032. Illustrative adhesives include cyanoacrylate (e.g. Loctite®380), epoxy resin, two-part epoxy, etc.

The adhesive 1012 may be applied only in the target area, e.g., under the transducer region 1008 of the die 1030. For example, to form the module 1050, the adhesive 1012 may be applied in the target area, the die aligned to the beam, and the adhesive allowed to cure.

In preferred approaches, the adhesive 1012 is applied in the target area, and a second, sacrificial adhesive 1018 is applied along the regions 1014, 1016 of the die 1030 to enhance stability of the die during adhesive curing and possibly other processing steps. See FIG. 10C. The sacrificial adhesive 1018 is later removed via conventional techniques. In one example, a solvent-resistant adhesive 1012 may fixedly attach the die to the beam under the transducer region 1008, while a sacrificial adhesive 1018 that dissolves in solvent is applied under the first and/or second region 1014, 1016, and later removed by application of the solvent thereto. An illustrative solvent is acetone, though any suitable known adhesives/solvent combination may be implemented. An example of an acetone-sensitive adhesive is cyanoacrylate (e.g. Loctite®380).

In some approaches, a sacrificial adhesive may be applied to facilitate taperless grind, beveling, cabling, wire bonding, etc. In some approaches, the sacrificial adhesive 1018 may hold the die 1030 to the beam 1032 while the solvent-resistant adhesive 1012 sets. Further, the sacrificial adhesive may be wicked in after the module is bonded to actuator pocket (not shown), and then the sacrificial adhesive may be dissolved in acetone after cable cure.

In a further approach, the first region 1014 and/or the second region 1016 may be flexibly attached to the beam 1032, e.g., by a flexible adhesive. Such flexible adhesive may remain in the module, i.e., is not removed, for such purposes as to dampen any resonance that may occur during use. Any known type of flexible adhesive may be used.

When the module 1050 is ready for use, the first region 1014 and the second region 1016 of the die 1030 are not fixedly attached the beam 1032, as shown in FIG. 10D.

In some approaches, the module 1050 may include at least one channel 1026 in the beam 1032, where the at least one channel 1026 may be positioned on a die-facing side 1009 of the beam 1032 and positioned adjacent to the center portion 1034 of the beam 1032, such that the center portion 1034 of the beam 1032 is fixedly attached to the transducer region 1008 of the die 1030. In some approaches, the channel may be a notch, recessed portion, etc. In other approaches, the module 1050 may include two channels 1026, 1028 in the beam, wherein each channel 1026, 1028 may be positioned on either side of the center portion 1034 of the beam 1032 and on the die-facing side 1009 of the beam 1032. Furthermore, the transducer region 1008 of the die 1030 is fixedly attached to the center portion 1034 of the beam 1032 with a channel 1026, 1028 on either side of the center portion 1034.

The at least one channel 1026 may act as an adhesive overflow reservoir for preventing excess adhesive from flowing under and beyond the regions 1014, 1016 of the die 1030. In some approaches, the channels 1026, 1028 may create a "glue island" on center portion 1034 of the beam 1032 beneath the transducer region 1008 of the die 1030.

In preferred approaches, a center portion 1034 of the beam 1032 may be positioned under the array of transducers 1003. In some approaches, the center portion 1034 may be positioned under about the transducer region 1008 of the die 1030. In further approaches, the center portion 1034 may extend along the beam 1032 beyond the extent of the transducer region 1008, toward one or both ends of the beam.

In some approaches, a width $w_c$ of the center portion 1034 along the longitudinal axis 1035 of the beam 1032 may be at least the width of the array of transducers 1003 parallel to the longitudinal axis 1035 of the beam 1032 as measured between the outermost transducers. In other approaches, the width $w_c$ of the center portion is less than the width of the array of transducers 1003.

In approaches using LTO heads, the width $w_c$ of the center portion 1034 of the beam 1032 is approximately 3 mm or less.

In some approaches, the die 1030 may have a protecting coating 1036 of conventional type thereon.

Figure 10E:
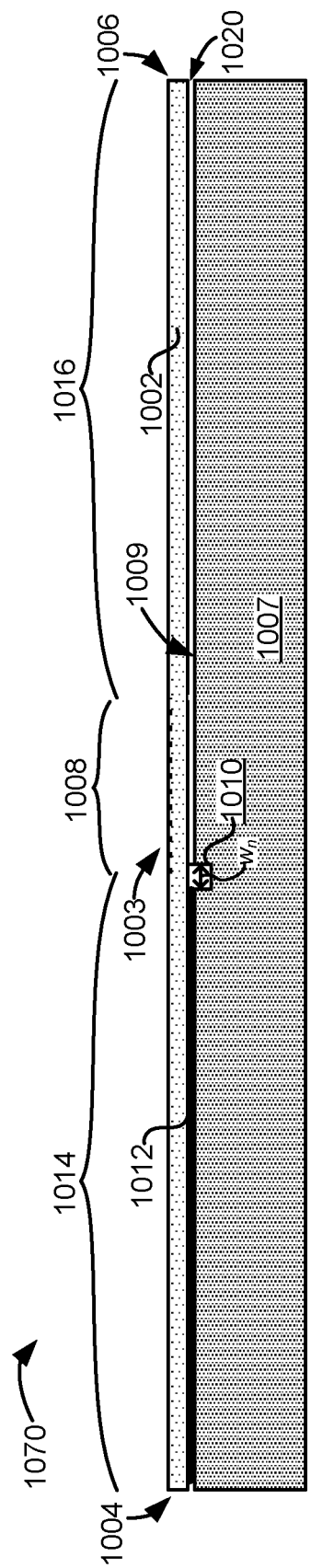
FIG. 10E is a side view of a module, in accordance with one embodiment.

FIG. 10E is a schematic drawing depicting a low stress tape head module 1070 that is a variant of the module depicted in FIG. 10A, in accordance with one embodiment. Accordingly, FIG. 10E shares common numbering with FIG. 10A. As an option, the present module 1070 may be implemented in conjunction with features from any other embodiment listed herein, such as those described with reference to the other FIGS. Of course, however, such a module 1070 and others presented herein may be used in various applications and/or in permutations which may or may not be specifically described in the illustrative embodiments listed herein. Further, the module 1070 presented herein may be used in any desired environment.

Referring to FIG. 10E, the module 1070 includes a die 1002 bonded to a beam 1007. However, the notch 1010 on the die-facing side 1009 of the beam 1007 is smaller than the notch 1010 shown in FIG. 10A. In some approaches, the notch 1010 may be a channel, recessed portion, etc. The notch 1010 may act as an adhesive overflow reservoir for preventing excess adhesive from flowing under and beyond the transducer region 1008 of the die 1002.

As shown, a width $w_n$ of the notch 1010 parallel to the longitudinal axis of the die is less than the width of the array of transducers 1003. As shown in FIG. 10E, the end of the notch 1010 closest to the adhesive 1012 is preferably under the first region 1014 to prevent adhesive from coupling the transducer region 1008 directly to the beam 1007.

In addition to the cantilevered dice according to any approach described above, the writing die or dice are also trimmed to have about the same in-plane width as the reading die or dice in a tape head.

Figure 11:
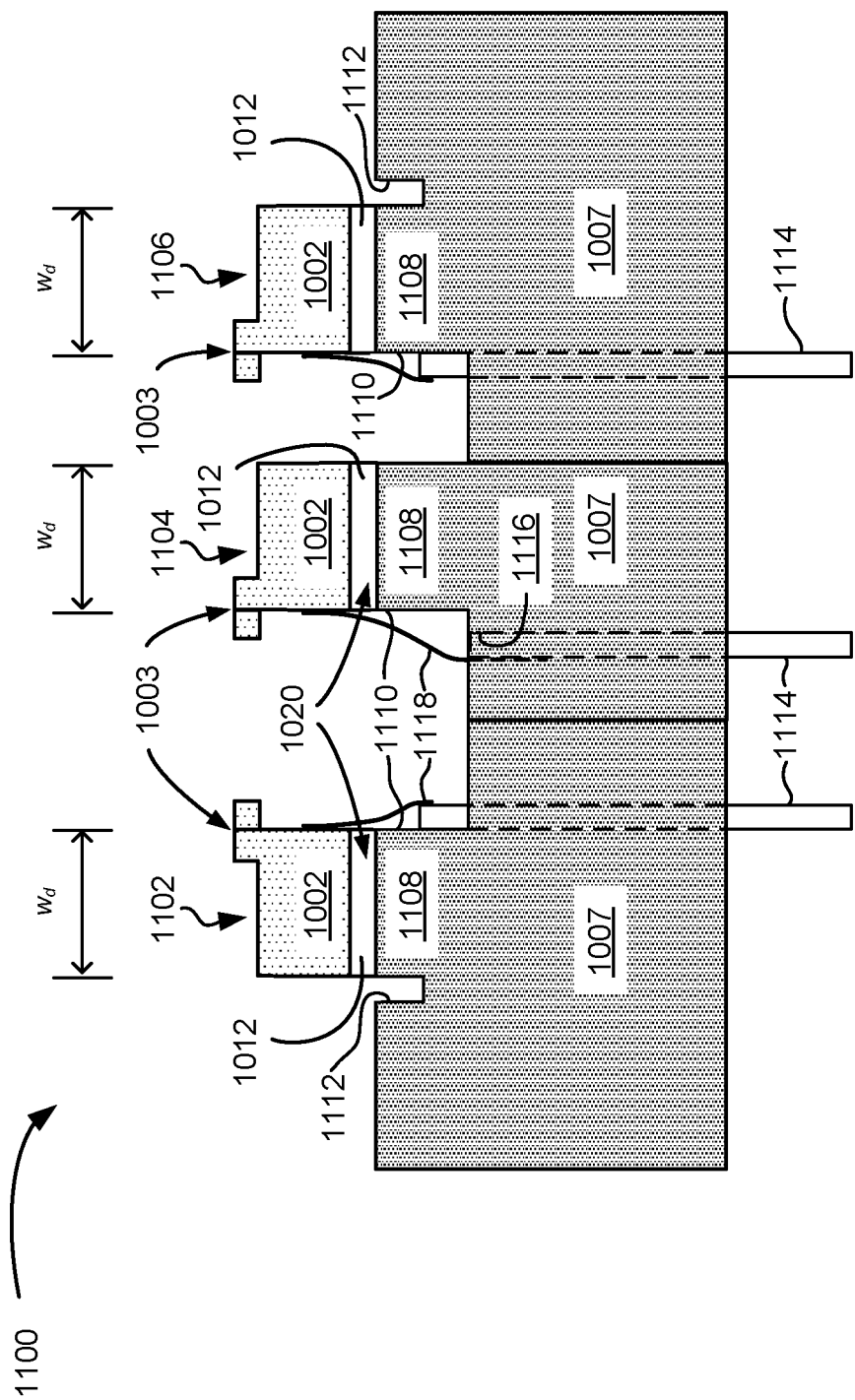
FIG. 11 is a side view of a tape head, in accordance with one embodiment.

FIG. 11 is a schematic drawing depicting a low stress tape head 1100, in accordance with one embodiment. As an option, the present head 1100 may be implemented in conjunction with features from any other embodiment listed herein, such as those described with reference to the other FIGS, especially FIGS. 1, 2A, 3-7, 10A-10E. Of course, however, such a head 1100 and others presented herein may be used in various applications and/or in permutations which may or may not be specifically described in the illustrative embodiments listed herein. Further, the head 1100 presented herein may be used in any desired environment.

For exemplary purposes, various components of FIG. 11 have common numbering with common components of FIG. 10A.

Referring to FIG. 11, the head 1100 includes three modules 1102, 1104, 1106 coupled together to form the head 1100, each module having a die 1002 bonded to a pedestal 1108 of the associated beam 1007. In this example, the modules 1102, 1104, 1106 are arranged in a W-R-W configuration with the outer modules 1102, 1106 being writer modules and the inner module being a reading module 1104. However, the head 1100 may have any number of modules, e.g., two, four, five, etc.

Each reading die has an array of read transducers extending parallel to the longitudinal axis of the reading die. Each writing die has an array of write transducers extending parallel to the longitudinal axis of the writing die. Moreover, in some approaches, each module has arrays of read and write transducers, e.g., in a piggyback configuration.

At least one region of at least one die is cantilevered over the associated beam, e.g., as described above with reference to FIGS. 10A-10E. Preferably, at least one region of the writing die is cantilevered over the associated write beam, e.g., as described above with reference to FIGS. 10A-10E. Also and/or alternatively, at least one region of the reading die is preferably cantilevered over the associated read beam, e.g., as described above with reference to FIGS. 10A-10E.

Widths $w_d$ of the reading and writing dice 1002 (not including the closure) measured in a direction of tape travel thereover are substantially the same, e.g., within 10% of one another. Any suitable width $w_d$ may be selected, as would be apparent to one skilled in the art upon reading the present disclosure.

Similarly, widths of the pedestals 1108 of the read and write beams measured in the direction of tape travel thereover are substantially the same. Any suitable width of the pedestals may be selected, as would be apparent to one skilled in the art upon reading the present disclosure.

Preferably, the widths of the pedestals 1108 are similar to, and ideally substantially the same as, the widths of the dice 1002, or at least the transducer region of the associated die.

Making the widths of the dice 1002 and the pedestals 1108 substantially the same reduces any residual stress introduced during the assembly manufacturing operations so that dimensional changes introduced to the head 1100 that materially affect the alignment of the various transducers within the head and/or transducer pitch within each die are minimized.

As shown in FIG. 11, the beam 1007 of each writing module 1102, 1106 preferably has a ledge 1110 extending along one side thereof toward each end of the respective beam for glue control, e.g., to prevent glue used to couple the beams together from creeping between the cantilevered end(s) of the die and the beam. Preferred approaches include both the ledge 1110 and the aforementioned notch(es) 1010, 1026, 1028 (FIGS. 10A, 10C, 10D) for glue control. As also shown in FIG. 11, the ledge 1110 of the beam of each write module 1102, 1106 may define one side of the pedestal 1108 thereof.

The beam 1007 of the read module 1104 may also have a ledge 1110, channel 1112 and/or notch(es).

As shown in FIG. 11, if the beam 1007 is wider than the desired width of the pedestal 1108 thereof in the tape travel direction, a channel 1112 may be formed in an upper surface of the beam 1007, thereby defining one side of the pedestal 1108 thereof. Any known technique to form the channel may be used. In a preferred approach, the channel 1112 is created during a taperless grind operation that defines a width $w_d$ of the associated die 1002.

A cable 1114 may be operatively coupled to each die 1002, e.g., a read cable to the die 1002 of the reading module 1104 and write cables to the dice 1002 of the writing modules 1102, 1106. In some approaches, the cable 1114 may be coupled directly to the associated die 1002 in a conventional manner. In preferred embodiments, each cable is coupled to a face of the associated beam 1007, with connections such as wire bonding 1118 between the cable 1114 and the associated die 1002, or any other conventional connection technique that would become apparent to one skilled in the art upon reading the present disclosure.

Moreover, the cable 1114 for the reading module 1104 is preferably coupled to a face 1116 (shown in shadow) of the beam 1007 extending along a plane that is spaced from the die 1002 of the reading module 1104 in an intended direction of tape travel thereacross. Wire bonding 1118 couples each read cable to the associated reading die across the ledge 1110 of the beam 1007 of the reading module 1104.

In various embodiments, the material of a beam may be modified to minimize susceptibility to head assembly conditions. In some approaches, the material of beam assembly may be modified to minimize susceptibility to head mechanical cycling.

Figure 12:
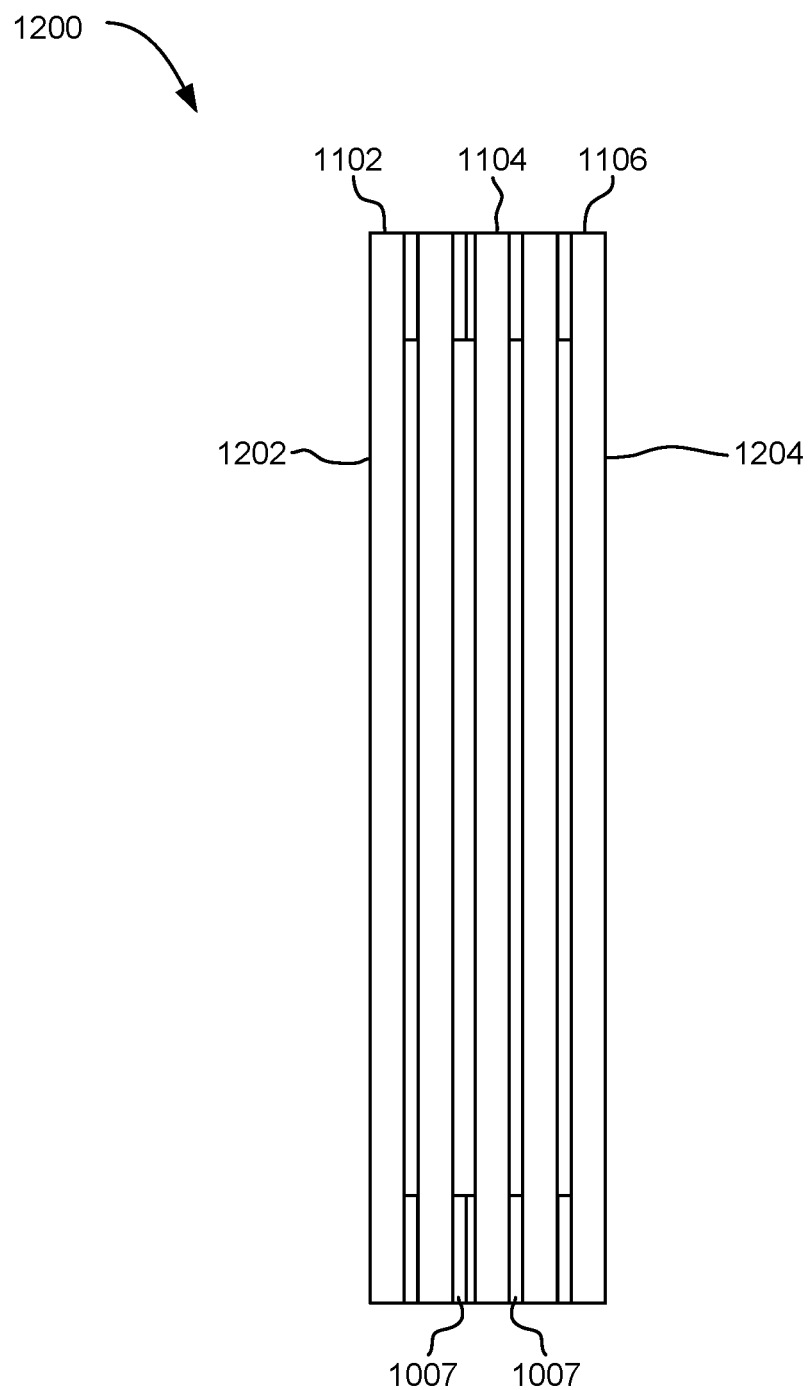
FIG. 12 is a side view of a tape head having dummy modules, in accordance with one embodiment.

FIG. 12 is a schematic drawing depicting a low stress tape head 1200, in accordance with one embodiment. As an option, the present head 1200 may be implemented in conjunction with features from any other embodiment listed herein, such as those described with reference to the other FIGS, especially FIGS. 1 and 10A-11. Of course, however, such a head 1200 and others presented herein may be used in various applications and/or in permutations which may or may not be specifically described in the illustrative embodiments listed herein. Further, the head 1200 presented herein may be used in any desired environment.

For exemplary purposes, various components of FIG. 12 have common numbering with common components of FIG. 11.

As shown in FIG. 12, dummy modules 1202, 1204 are coupled to the outer modules 1102, 1106 to balance the stresses on the outer modules 1102, 1106. The dummy modules 1202, 1204 preferably create an interface with the outer modules 1102, 1106 that is similar to the interface at the junction of the inner and outer modules 1104, 1102, 1106, thereby balancing out any stresses imparted by the inner module 1104 onto the outer modules 1102, 1106. As shown, the dummy modules 1202, 1204 have the shape of U-beams, and are coupled to the beams 1007 of the outer modules 1102, 1106. The dummy modules 1202, 1204 may simply be beams, or may include dummy dice, as desired by the manufacturer.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
at least one reading die coupled to a pedestal of an associated read beam, each reading die having an array of read transducers extending parallel to a longitudinal axis of the reading die; and
at least one writing die coupled to a pedestal of an associated write beam, each writing die having an array of write transducers extending parallel to a longitudinal axis of the writing die,
wherein the read and write beams are coupled together thereby forming a head,
wherein at least one region of at least one of the dice is cantilevered over the associated beam,
wherein widths of the reading and writing dice measured in a direction of tape travel thereover are substantially the same,
wherein widths of the pedestals of the read and write beams measured in the direction of tape travel thereover are substantially the same,
wherein the widths of each pedestal of the read and write beams measured in the direction of tape travel thereover are less than a width of each respective read and write beam measured in the same direction.

2. An apparatus as recited in claim 1, wherein the write transducers of each writing die are positioned in a transducer region of the writing die, wherein each writing die includes a first region extending from the transducer region to a first end of the writing die and a second region extending from the transducer region to a second end of the writing die, wherein the first region of each writing die is fixedly attached to the write beam and wherein the transducer region and the second region are cantilevered over the associated write beam.

3. An apparatus as recited in claim 1, wherein the write transducers of each writing die are positioned in a transducer region of the writing die, wherein each writing die includes a first region extending from the transducer region to a first end of the writing die and a second region extending from the transducer region to a second end of the writing die, wherein the transducer region of each writing die is fixedly attached to the write beam and wherein the first region and the second region are cantilevered over the write beam.

4. An apparatus as recited in claim 3, wherein ends of each writer die are flexibly attached to the associated write beam.

5. An apparatus as recited in claim 1, wherein at least one region of each reading die is cantilevered over the associated read beam.

6. An apparatus as recited in claim 5, wherein at least one region of each writing die is cantilevered over the associated write beam.

7. An apparatus as recited in claim 1, wherein each write beam has a ledge extending along one side thereof toward each end thereof for glue control.

8. An apparatus as recited in claim 1, comprising at least one notch in each write beam, wherein the at least one notch is positioned on a die facing side of the respective write beam and positioned adjacent to a transducer region of the associated writing die, wherein the at least one notch is an adhesive overflow reservoir.

9. An apparatus as recited in claim 8, comprising two of the notches in each write beam positioned on opposite sides of the transducer region of the associated writing die.

10. An apparatus as recited in claim 8, wherein the notch is positioned under the array of write transducers.

11. An apparatus as recited in claim 1, wherein the width of the pedestal of each write beam is at least as wide as a width of a transducer region of the associated writing die measured in the direction of tape travel thereover.

12. An apparatus as recited in claim 1, wherein a transducer region of each die is positioned at about a center portion of the associated beam.

13. An apparatus as recited in claim 1, wherein a channel extending into a die facing side of one of the beams defines one side of the pedestal of said beam, wherein opposite sides of the channel and a bottom of the channel extend along the beam in a direction perpendicular to the direction of tape travel thereover.

14. An apparatus as recited in claim 1, wherein a channel in a die facing side of each write beam defines one side of the pedestal thereof.

15. An apparatus as recited in claim 1, comprising two of the writing dice positioned on opposite sides of one of the reading die.

16. An apparatus as recited in claim 1, comprising a read cable coupled to each reading die and a write cable coupled to each writing die, wherein each read cable is coupled to a face of the associated read beam, a plane extending along the face being spaced from the reading die in an intended direction of tape travel thereacross.

17. An apparatus as recited in claim 16, comprising wire bonding coupling each read cable to the associated reading die.

18. An apparatus as recited in claim 1, comprising dummy beams positioned outside outermost ones of the read and/or write beams, the dummy beams either having no die thereon or having a dummy die thereon.

19. An apparatus as recited in claim 1, further comprising:
   a drive mechanism for passing a magnetic medium over the reading and writing dice; and
   a controller electrically coupled to the reading and writing dice.

20. An apparatus as recited in claim 1, wherein the width of at least one of the pedestals is substantially the same as the width of the die coupled thereto.

* * * * *